(12) United States Patent
Find

(10) Patent No.: US 9,545,595 B2
(45) Date of Patent: Jan. 17, 2017

(54) METHOD FOR THE REMOVAL OF CONTAMINANTS FROM A CARBON DIOXIDE FEEDING LIQUID STREAM

(75) Inventor: Rasmus Find, Vejle (DK)

(73) Assignee: UNION ENGINEERING A/S, Fredricia (DK)

( * ) Notice: Subject to any disclaimer, the term of this patent is extended or adjusted under 35 U.S.C. 154(b) by 1302 days.

(21) Appl. No.: 13/056,893

(22) PCT Filed: Jul. 24, 2009

(86) PCT No.: PCT/DK2009/050190
§ 371 (c)(1),
(2), (4) Date: Apr. 27, 2011

(87) PCT Pub. No.: WO2009/132661
PCT Pub. Date: Nov. 5, 2009

(65) Prior Publication Data
US 2011/0200517 A1    Aug. 18, 2011

(30) Foreign Application Priority Data

Jul. 29, 2008  (DK) .................... 2008 01046

(51) Int. Cl.
*B01D 53/14* (2006.01)
*C01B 31/20* (2006.01)
*F23J 15/04* (2006.01)

(52) U.S. Cl.
CPC ....... *B01D 53/1418* (2013.01); *B01D 53/1475* (2013.01); *C01B 31/20* (2013.01);
(Continued)

(58) Field of Classification Search
CPC ................... B01D 2256/22; B01D 2257/302; B01D 2257/404; B01D 2257/7027; B01D 2257/708; B01D 53/1418; B01D 53/1475; F23J 15/04; F23J 2215/50; Y02C 10/06
See application file for complete search history.

(56) References Cited

U.S. PATENT DOCUMENTS 3,266,220 A      8/1966 Woertz
3,622,267 A  * 11/1971 Bartholome et al. ......... 423/229
(Continued)

FOREIGN PATENT DOCUMENTS

CA    2557911 A1    3/2005
EP    0588175 A2    3/1994
(Continued)

OTHER PUBLICATIONS

Nsakala, et al., "Engineering Feasibility of CO2 Capture on an Existing US Coal-Fired Power Plant", 2001, pp. 87-98.
(Continued)

*Primary Examiner* — Duane Smith
*Assistant Examiner* — Cabrena Holecek
(74) *Attorney, Agent, or Firm* — Browdy and Neiman, PLLC

(57) ABSTRACT

The present invention relates to a method for recovery of high purity carbon dioxide from a gaseous source and uses thereof. More specifically, the present invention relates to the production of high purity carbon dioxide, which is substantially free of nitrogen, oxygen, nitrogen oxides, sulphurous compounds and volatile organic contaminants, particularly benzene. The present invention also relates to a method for removal of benzene from a carbon dioxide feeding gas as well as the use of said high purity carbon dioxide in foodstuffs.

21 Claims, 4 Drawing Sheets

(52) U.S. Cl.
CPC ........... *F23J 15/04* (2013.01); *B01D 2256/22* (2013.01); *B01D 2257/302* (2013.01); *B01D 2257/404* (2013.01); *B01D 2257/708* (2013.01); *B01D 2257/7027* (2013.01); *F23J 2215/50* (2013.01); *Y02C 10/06* (2013.01); *Y02P 20/152* (2015.11)

(56) References Cited

U.S. PATENT DOCUMENTS

| | | | | |
|---|---|---|---|---|
| 4,553,984 | A | * | 11/1985 | Volkamer et al. ............. 95/177 |
| 5,435,169 | A | * | 7/1995 | Mitra ........................... 73/23.41 |
| 5,832,712 | A | | 11/1998 | Rønning et al. |
| 6,146,603 | A | | 11/2000 | Chakravarti et al. |
| 6,174,506 | B1 | | 1/2001 | Chakravarti et al. |
| 7,829,049 | B2 | | 11/2010 | Find et al. |
| 2005/0048131 | A1 | * | 3/2005 | Gabbay ........................ 424/635 |
| 2007/0148069 | A1 | | 6/2007 | Chakravarti et al. |
| 2008/0025893 | A1 | | 1/2008 | Asprion et al. |
| 2008/0081938 | A1 | * | 4/2008 | Schultz et al. ................ 585/648 |
| 2009/0093555 | A1 | * | 4/2009 | Stites et al. .................. 518/702 |
| 2011/0200517 | A1 | * | 8/2011 | Find ............................ 423/437.1 |

FOREIGN PATENT DOCUMENTS

| | | | | |
|---|---|---|---|---|
| EP | 0588175 | * | 8/1997 | ............ B01D 53/14 |
| EP | 1059110 | A1 | 12/2000 | |
| EP | 1061045 | A1 | 12/2000 | |
| JP | 2007253104 | A | 10/2007 | |
| WO | WO 2004073838 | A1 | 9/2004 | |
| WO | WO 2005087349 | A1 | 9/2005 | |
| WO | WO 2005087350 | A1 | 9/2005 | |
| WO | WO 2006037323 | A1 | 4/2006 | |
| WO | WO 2007009461 | A2 | 1/2007 | |
| WO | WO 2007075399 | A1 | 7/2007 | |
| WO | WO 2008086812 | A1 | * | 7/2008 ............ C01B 31/20 |

OTHER PUBLICATIONS

Office Action Mailed Jan. 5, 2010, copending U.S. Appl. No. 11/996,110.

* cited by examiner

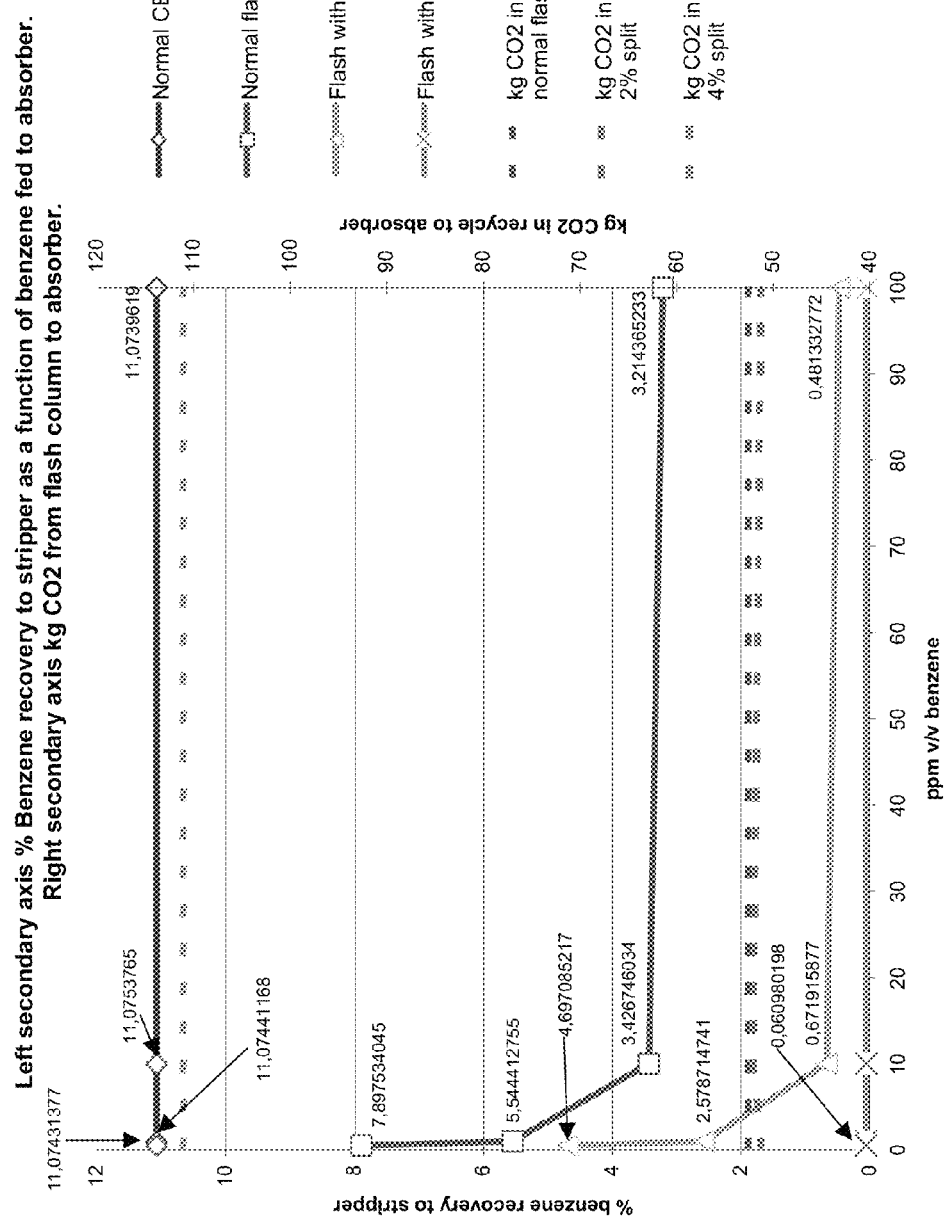

METHOD FOR THE REMOVAL OF CONTAMINANTS FROM A CARBON DIOXIDE FEEDING LIQUID STREAM

The present invention relates to a method for recovery of high purity carbon dioxide from a gaseous source and uses thereof. More specifically, the present invention relates to the production of high purity carbon dioxide, which is substantially free of nitrogen, oxygen, nitrogen oxides, sulphurous compounds and volatile organic contaminants, particularly benzene. The present invention also relates to a method for removal of benzene from a carbon dioxide feeding stream as well as the use of said high purity carbon dioxide in foodstuffs.

BACKGROUND OF THE INVENTION

Carbon dioxide is a well-known gas, which is present in the atmosphere. It is released to the atmosphere in large amounts by fermentation processes, limestone calcinations, and all forms of combustion processes of carbon and carbon compounds. In the recent decades, the attention in respect of said emission has been rising, because of the environmental problem due to future climate changes via the Greenhouse effect. Consequently, extensive work has been performed over the years in order to develop processes for the removal of carbon dioxide from combustion gases. If possible, a subsequent recovery of carbon dioxide may make those processes economically feasible.

One type of conventional method for the recovery of carbon dioxide from a gaseous source is the absorption method, in which carbon dioxide is absorbed in an absorbing agent. If other gases, such as oxygen, are present in the gaseous source, said other gases may also be absorbed chemically and/or physically. This will be the case if an amine-based agent is used as the absorbing agent.

It is well-known from the prior art that when $O_2$ is present in the carbon dioxide-containing gaseous source, and when alkanolamine is used as the absorbing agent, said $O_2$ will be transferred into the alkanolamine-containing absorbing agent during the absorption procedure. As a consequence an unwanted degradation of alkanolamine as well as corrosion problems will occur due to the presence of $O_2$.

Many prior art documents relate to this problem. EP 1 059 110 discloses a system for recovering absorbate such as carbon dioxide using an alkanolamine absorbent fluid, wherein the loaded absorbent is heated in a two step heating procedure prior to the separation of the absorbate from the absorbent, and wherein the loaded absorbent is deoxygenated after the first heating step and prior to the second heating step. The deoxygenation takes place by means of depressurisation.

In EP 1 061 045 a system for recovering absorbate such as carbon dioxide from an oxygen-containing mixture is described, wherein carbon dioxide is concentrated in an alkanolamine-containing absorption fluid, oxygen is separated from the absorption fluid, and carbon dioxide is steam stripped from the absorption fluid and recovered. In this system, the oxygen is separated from the absorption fluid by passing the carbon dioxide loaded absorbent comprising dissolved oxygen in countercurrent mass transfer contact with oxygen scavenging gas.

In other cases, nitrogen oxides (also named NOx), sulphurous compounds and volatile organics may be present as contaminants in addition to $O_2$ in the gaseous source. These contaminants will also be absorbed chemically and/or physically in the absorbing agent, when an amine-based agent is used as the absorbing agent.

In a conventional plant for production of high purity carbon dioxide, the carbon dioxide is firstly absorbed in an absorbing agent and afterwards the carbon dioxide and the absorbing agent is separated in a stripper column. However, part of the contaminants present in the feed gas is absorbed together with carbon dioxide during the absorption step. When separating the carbon dioxide from the absorbing agent in a subsequent stripper process, part of the absorbed contaminants will also be released in the stripper off gas together with the carbon dioxide. The stripper off gas will further contain $N_2$ and $O_2$ in some amounts.

When producing food grade carbon dioxide or other carbon dioxide applications, where a high purity is required, these contaminants must be removed from the stripper off gas in down stream equipment in order to obtain the required purity. Conventional technology available for removing such contaminants includes scrubbing, oxidation, adsorption and distillation.

The first step of the down stream purification of the stripper off gas is most often an oxidation process. In this oxidation step any NOx's present is oxidised to nitrate, which subsequently may be removed as a liquid phase. Furthermore, if sulphur is present as hydrogen sulphide, this compound is oxidised to free sulphur. Unfortunately, this oxidation requires a large supply of chemicals. Various oxidation agents may be used. In particular, potassium permanganate is widely used. However, this particular chemical is highly hazardous and, furthermore, as potassium permanganate may be used for the production of explosives, it is to be expected that commercial use of this chemical may at some point be forbidden.

In the next step of the down stream purification the carbon dioxide containing gas is passed to a dehydrator. In this dehydrator any water present in the gas is absorbed and thereby removed from the gas stream. However, if any residues of acetaldehyde and/or volatile oxygenates are present in the gas, these compounds are also removed in the dehydrator.

In the last step of the down stream purification, the gaseous carbon dioxide is liquefied in a condenser. In the condenser, it is possible to remove any residues of NO, which may still be present. This, however, is not the case for any residues of $NO_2$. In fact if any $NO_2$ is present when the gas reaches the condenser, or if any $NO_2$ is produced inside the condenser, for example due to oxidation of NO, said $NO_2$ will be transferred to the liquid phase in the condenser and is subsequently almost impossible to remove.

Furthermore, carbon dioxide streams may comprise various amounts of volatile organic compounds, such as benzene, which due to regulatory restrictions and internal standards, must be removed to contents as low as in the range of parts per billion (ppb).

Traditionally, benzene residues in the gaseous stream are removed in a carbon filter in a down stream operating unit, which carbon filter is designed to remove the specific content of benzene in the stream.

However, if the composition of the gaseous stream varies for a specific process, so that the carbon filter is not able to retain all benzene present in the gaseous stream, carbon dioxide comprising too high concentrations of benzene may reach the end product such as soft drinks, which would have a seriously adverse impact in a health risk perspective, but certainly also from a marketing point of view.

Additionally, further means for more efficient purification of gaseous streams is always an ongoing need in the field.

SUMMARY OF THE INVENTION

Hence, an object of the present invention is to provide a method for the recovery of high purity carbon dioxide, which is substantially free of contaminants in a simple and more cost efficient manner.

It is further an object of the present invention to provide a method in which benzene will be effectively removed regardless of whether the benzene content is constant or varying.

It is still another object of the present invention to provide an improved method for removing other contaminants in a flash step.

Previously the present inventors found that by introducing a flash column between the absorption column and the stripper column the content of NOx in the stripper off gas can be markedly reduced.

Surprisingly, it has now been found that by providing a warm wet gaseous stream of carbon dioxide at the bottom of the flash column, NOx's may be more effectively removed.

It has also, surprisingly, been found that in addition to NOx's also sulphurous compounds and, particularly, volatile organic contaminants, such as aromatics, and more specifically benzene, can be efficiently removed in the flash column. In a particular aspect, it was found that at benzene levels higher than 10 ppm (mole/mole) the flash step more effectively removed benzene from the gaseous stream. Thus, contrary to other benzene removing means, such as a carbon filter, the efficiency of benzene removal increases as the content of benzene increases, and is thus not dependent on constant benzene content for optimal benzene removal, which is a huge advantage of the present invention.

Hence, by introducing this flash column several beneficial effects are obtained.

First of all, the content of contaminants in the stripper off gas is so low that the subsequent oxidation is no longer required. Hence, the consumption of chemicals is reduced and no subsequent disposal of these used chemicals is necessary.

Secondly, substantially no $NO_2$ is present in the liquid carbon dioxide phase leaving the condenser. This is due to the fact that as almost all $O_2$ has been removed in the flash column, the chemical equilibrium $NO+\frac{1}{2}O_2 \leftrightarrow NO_2$, will shift to the left to form mainly NO. Therefore, no $NO_2$ is present in the gas, when the gas later on enters the condenser. Furthermore, no $NO_2$ is produced in the condenser because of the very low content of $O_2$ in the gas. Hence, substantially no $NO_2$ can be found in the liquid carbon dioxide product.

Thirdly, there will be no compromise of product quality if the composition of the stream changes during operation.

Fourthly, it has been found that the energy consumption for operating the condenser is markedly reduced. This effect is considered to be due to the fact that the very low content of contaminants in the gas phase will increase the overall heat transfer coefficient as well as the dew point temperature compared to conventional plants. This leads to higher suction pressure for the refrigeration compressors for the condensation process, which also leads to a reduced energy requirement for the condensation.

Finally, the product yield is increased because the loss of gaseous carbon dioxide in the condenser is markedly lowered as compared to conventional plants for production of high purity carbon dioxide.

FIGURES

FIG. 4 is a graph showing benzene recovery in the stripper off gas at various concentrations of benzene in the gas fed to the absorption column.

DESCRIPTION OF THE INVENTION

Figure 1:
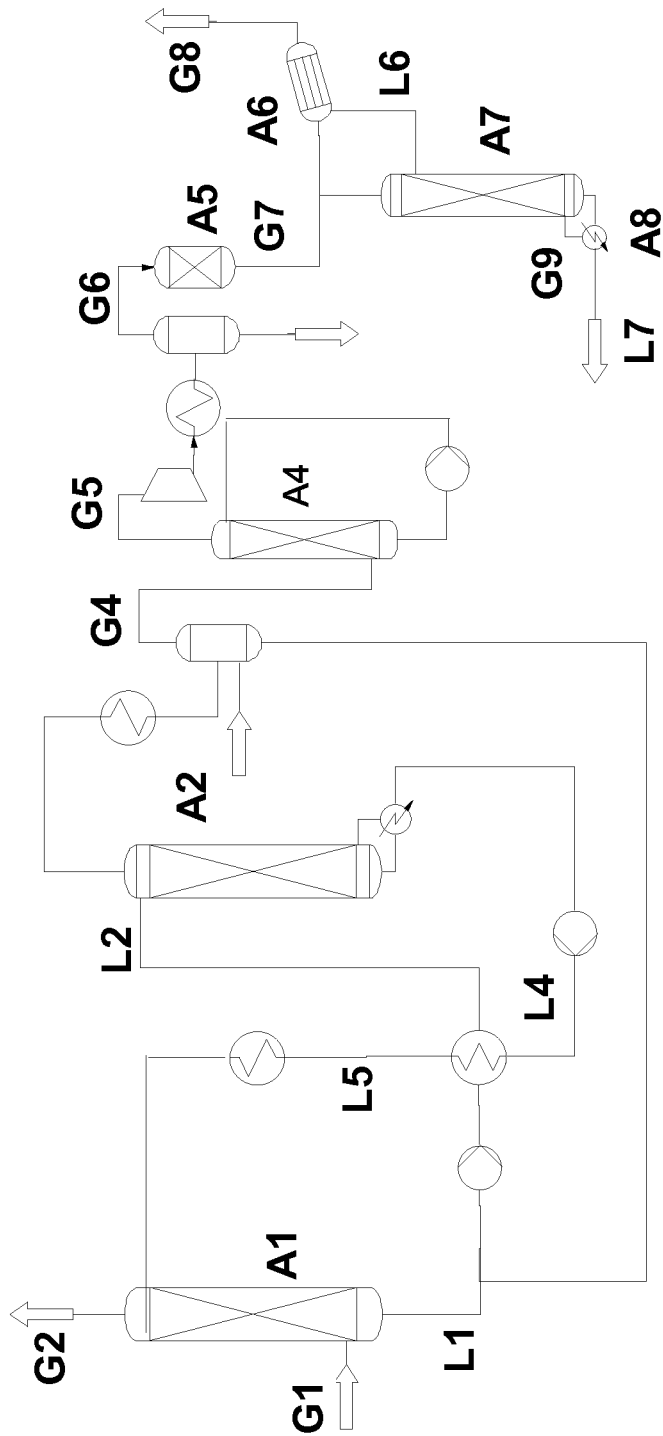
FIG. 1 depicts a schematic flow diagram for the $CO_2$ recovery in a conventional plant.

In one aspect, the present invention relates to a method for recovery of high purity carbon dioxide from a gaseous source, where said high purity carbon dioxide is substantially free of contaminants, for example nitrogen oxides sulphurous compounds and volatile organic compounds, such as aromatics, and specifically benzene.

Thus, in a first aspect, the present invention provides a method for the removal of benzene from a liquid carbon dioxide stream by means of introducing the liquid into a flash column.

It has surprisingly been found that benzene can be effectively removed from the liquid stream in the flash column as compared to the same process without a flash column, in a particular embodiment the concentration of benzene in the stream is relatively high, i.e. over 10 ppm (mole/mole). In fact, it surprisingly turned out that increasing contents of benzene in the stream resulted in a more effective benzene removal in the methods of the invention, and consequently the benzene removal according to the method of the present invention is not compromised if the concentration of benzene increases or varies.

Removal of benzene, which is a carcinogen, is of extreme importance where the carbon dioxide is intended for human and/or animal consumption and/or treatment. When a carbon dioxide recovery plant is installed, said plant is often designed with the aim of having a specific composition of components in the gaseous stream entering the plant. Thus, the present invention is particularly useful in situations where the composition of the starting gaseous stream may change.

Additionally, because the majority of benzene is removed during the flash step, if present, a traditional carbon filter for removing residual benzene, if required at all, may be operated longer before being replaced. Thus, the present invention provides the use of a flash column in a carbon dioxide recovery plant to remove benzene, and particularly when present in the carbon dioxide feeding gas at levels of at least 1, 2, 4, 6, 8 or 10 ppm or higher.

In various embodiments of the method, the flash step is preceded by the steps of: a. feeding a gas comprising carbon dioxide, oxygen, $N_2$, nitrogen oxides, volatile organic contaminants, particularly benzene, into an absorption column; and/or b. absorbing the gas in an absorbing agent, by which the gas is separated into a carbon dioxide-lean gas and a carbon dioxide-rich liquid, and c. pressurising and heating the liquid obtained in step b, and optionally followed by the steps of: e. pressurising the liquid leaving the flash column in step d; and/or f. separating the liquid obtained in step e into a carbon dioxide-rich stripper off gas and a carbon dioxide-depleted liquid by means of stripping in a stripper column; and/or g. feeding a fraction of the carbon dioxide rich stripper off gas at the bottom of the flash column of step d. All or some of the steps may be present, as required.

In still other embodiments the method further comprises the steps of: h. washing the gas obtained in step f; and/or j. dehydrating the carbon dioxide rich gas e.g. obtained in step h; and/or k. condensing the carbon dioxide rich gases obtained and/or l. distilling the carbon dioxide rich stream, e.g. the condensed carbon dioxide of step k and/or m. storing the carbon dioxide in a storage tank. Any of the above operating steps may be preceded by pressurising and/or cooling or heating as appropriate.

In still another embodiment, any of the above obtained carbon dioxide rich streams may be split in two fractions, one of which is recirculated and fed at the bottom of the flash column. In this embodiment step g may be omitted. As with the stripper off gas, these carbon dioxide streams may be fed at a fraction of at least 1% (mole/mole) of the total stream. The point, at which the carbon dioxide rich stream is recirculated, will depend on the degree of purity required versus the desired product yield. As the carbon dioxide stream is taken further down stream in the plant, the effect of the recirculation will increase, but at the same time the final yield will decrease.

These embodiments provide a complete carbon dioxide recovery process in which each of the additional steps included are often present in an absorption based carbon dioxide recovery process.

Step g is a presently preferred feature of the method of the present invention, as recirculating relatively small amounts of the stripper off gas (as low as at least 1%, such as 2% or 4% (mole/mole)) of the total stripper off gas fed to the flash column results in a dramatic effect on the removal of contaminants originally present in the feeding gas. Higher percentages are also contemplated such as 6, 8, 10% or more. However, as the stripper off gas is actually the desired product, i.e. substantially pure carbon dioxide, recirculating the gas to the flash column will compromise the yield of the carbon dioxide product. Thus, the fraction to be recirculated should be chosen with due regard to the achieved degree of purification as compared to the reduction in carbon dioxide yield.

The present inventors surprisingly found that 2% was enough to achieve a significant effect, while 4% was required to achieve a significant effect on benzene removal at low benzene concentrations in the feeding gas (in this context lower means less than 10 ppm (mole/mole)).

The further purification steps described below, e.g. washing, dehydration, condensation, distillation etc. may also be applied to the method of the first aspect of the invention.

In a second aspect of the present invention a method for recovery of high purity carbon dioxide from a gaseous source is provided comprising the steps of:

a. feeding a gas comprising carbon dioxide and contaminants selected from the group consisting of oxygen, $N_2$, nitrogen oxides, sulphurous compounds and volatile organic contaminants, such as benzene, into an absorption column, b. absorbing the gas in an absorbing agent, by which the gas is separated into a carbon dioxide-lean gas and a carbon dioxide-rich liquid, c. pressurising and heating the liquid obtained in step, d. separating by means of flashing the liquid obtained in step c into a contaminant-rich gas and a contaminant-depleted liquid leaving the flash column, e. pressurising the liquid leaving the flash column in step d, f. separating the liquid obtained in step e into a carbon dioxide-rich stripper off gas and a carbon dioxide-depleted liquid by means of stripping in a stripper column, and g. separating the stripper off gas in two fractions, wherein a first fraction is recirculated and fed at the bottom of the flash column and the second fraction is cooled in order to provide a cooled gas.

By recirculating a fraction of the stripper off gas to the flash column it was surprisingly found that the contaminants of the gaseous stream were more effectively removed than in the prior art method describing removal of NOx's from a gaseous source by introducing a flash column. It was found that feeding just 1% (mole/mole) or more of the stripper off gas to the flash column, such as 2% or 4%, had a dramatic effect on removal of contaminants. Surprisingly, it was also found that when 4% (mole/mole) of the stripper off gas was fed to the flash column, particularly benzene when present in low concentrations (in this context below 10 ppm) was effectively removed.

Thus the two aspects of the present invention provide means for effectively removing contaminants from a gaseous carbon dioxide stream in one operating unit using a simpler and more cost-efficient setup. Additionally, the methods of the present invention are not dependent on a constant composition of the feeding gas, contrary to prior art methods for removal of particularly benzene. In fact, the methods of the present invention surprisingly seem to remove benzene more efficiently as the concentration of benzene in the feeding gas increases.

In another aspect, the present invention provides the use of the substantially pure carbon dioxide obtained in any of the methods of the present invention in such diverse applications as e.g. foodstuff, hospital devices, enhanced oil recovery or sequestration, all requiring carbon dioxide at specific degrees of purity.

The following detailed description applies equally to the different aspects of the methods of the present invention. The particular embodiments also apply equally to each of the aspects of the invention.

In principle, any kind of gas comprising carbon dioxide, oxygen, $N_2$, nitrogen oxides, sulphurous compounds and organic contaminants, specifically benzene, may be applied in the process. In a preferred embodiment, however, the feeding gas is flue gas.

In the absorption steps (step b), any absorbing agent capable of absorbing carbon dioxide either chemical or physical absorbing agents may be applied. As examples of physical absorbing agents selexol, methanol, purisol, genosorb or morphysorb can be mentioned. As examples of chemical absorbing agents, any amine-based absorbing agent can be mentioned. By the term "amine-based" absorbing agent is meant any agent, in which an amine group is incorporated as for example alkanolamines, such as monoethanolamine, diethanolamine, diisopropanolamine, methyldiethanolamine and triethanolamine, amino-alcohols, such as amino-diethylene-glycol, and amino acids and amino acids salts and derivatives thereof. Preferably, an amine-based absorbing agent is used. Other suitable absorbing agents are those mentioned in WO 2005087349 and WO 2005087350.

Most often the absorbing agent is an aqueous solution of one of the above-mentioned amine-based agents. However, mixtures comprising two or more of the listed agents in any mixing ratio may also be used in the method according to the present invention. It is within the skills of a practitioner to determine the optimal amount and composition of the absorbing agent in order to achieve a suitable absorption procedure.

The liquid leaving the absorption column is then heated and pressurised to a pressure higher than or equal to the pressure of the liquid leaving the absorber. The purpose of the pressurization is primarily to facilitate the transport of the liquid. It is within the knowledge of a skilled person to perform such processes.

As explained above, the introduction of the flashing steps (steps d) in the method of the present invention makes it possible to produce a stripper off gas, which is substantially free of oxygen, benzene and only contains traces of nitrogen oxides. However, in order to achieve this beneficial effect, the flash column must operate at a higher temperature and a pressure, which is higher than or close to the equilibrium conditions of the liquid stream leaving the absorption column. Under such conditions, the liquid entering the flash column will be unsaturated and the release of non-saturated components is possible. Hence, due to the new equilibrium conditions, substantially all $O_2$ and the main part of NOx will be removed from the flash column in the gas stream, and therefore never reach the stripper column.

In a preferred embodiment, the temperature of the liquid obtained in step c is in the range of 70° C. to 140° C., more preferred in the range of 90° C. to 120° C., and most preferred in the range of 95° C. to 110° C., and the pressure of said liquid is in the range of 0.1 bar to 3 bar, more preferred in the range of 0.2 to 2 bar, and most preferred in the range of 1 bar to 2 bar. Operating outside these ranges is normally not economically feasible. A person skilled in the art will know how to perform such pressurising and heating procedures.

The gas obtained in steps d, which comprises a significant amount of carbon dioxide in addition to oxygen, $N_2$, nitrogen oxides and optionally water, sulphurous compounds and volatile organic compounds, may be recycled to the absorption column in order for a second recovery procedure of the carbon dioxide. Alternatively, the said gas may be disposed of.

The liquid leaving the flash column is pressurised to a pressure that is higher than or equal to the pressure of the liquid leaving the flash column before entering the stripper column. A person skilled in the art will know how to perform such a pressurisation.

In the stripper column, the pressurised liquid from the flashing column is separated into a carbon dioxide-rich gas and a carbon dioxide-depleted liquid. As mentioned above, due to the removal of oxygen and nitrogen oxides in the flash column, the $O_2$ and NOx content will be reduced dramatically in the stripper off gas stream. Because of the reduced amount of NOx and the very limited amount of $O_2$ in the stripper off gas, the equilibrium reaction: $NO+\frac{1}{2}O_2 \leftrightarrow NO_2$, will shift to the left to form mainly NO.

The liquid obtained in steps f, which mainly comprises the absorbing agent, optionally an aqueous solution of the absorbing agent, may be recycled and mixed with the absorbing agent used for absorbing the gas in step b. However, before entering the absorption column, an adjustment of the temperature and/or the pressure of said liquid may be required.

The gas leaving the stripper column G3' (see FIG. 3) is then subjected to a downstream purification treatment. However, in certain circumstances the stripper off gas may be of such high purity that the subsequent purification is not necessary.

In a presently preferred embodiment of the present invention the gas G3' leaving the stripper column is split in two fractions, and the first fraction is fed directly at the bottom of the flash column.

Thus, in this embodiment the flash column is fed with a warm, wet carbon dioxide gas at the bottom of the column. Recirculating the stripper off gas stream to the flash column has a dramatic effect on removal of both nitrogen, oxygen and thus NOx's as well as volatile organic compounds, and in particular aromatics, such as benzene, regardless of the amount of benzene present in the gaseous stream to be purified in the flash column.

Additionally, when introducing this fraction of the stripper off gas to the flash column, benzene will be more efficiently removed and particularly at concentrations lower than 10 ppm in the feeding gas.

In one embodiment, the second fraction of the gas leaving the stripper is cooled and then fed into a washing column. In this column, any contaminants soluble in the washing liquid can be removed from the gas. A preferred washing liquid is water, due to the low solubility of carbon dioxide in water. A person skilled in the art would know how to perform such a washing step.

Particularly, when using aqueous solutions as an absorbent part of the gaseous water in the stripper off gas may be condensed in the cooling step, recycled and optionally mixed with the liquid entering the flash column or elsewhere in the upstream process. Hence, by introducing this recirculation, an adjustment of the water balance is achieved minimizing the need for an external water supply.

The gas leaving the washing column is now substantially free of any soluble contaminants, such as absorbent.

The gas is pressurised and cooled before the gas is entering the dehydrator. Hereby the water content is reduced. This pressurisation may be performed in one or more compression steps e.g. 1, 2 or 3 or even more.

In cases where no washing step is included in the method, the stripper off gas may in an embodiment be cooled and pressurised before entering the dehydrator. Alternatively, the dehydration may be performed prior to compression or during compression. It is within the knowledge of a skilled person to perform these pressure and temperature regulations.

In the dehydration unit water is removed. Particularly when using adsorption, oxygenates and volatile organics can effectively be removed. Examples of oxygenates, which can be removed, are acetaldehyde and methanol. A practitioner would know how a conventional dehydration unit operates.

In a particular embodiment, the gas leaving the stripper column is fed directly to the dehydrator without a washing step. In another embodiment, the gas is subjected to the washing step before being fed to the dehydrator.

The dry gas then enters the condenser, in which the gas is separated into a carbon dioxide-rich liquid and a gaseous mixture of carbon dioxide and non-condensable gases, e.g. NO, $N_2$, $O_2$. The gas entering the condenser is substantially free of $NO_2$. Because of the introduction of the flash column between the absorption column and the stripper column, almost all $O_2$ and a main part of NOx are removed from the gas stream. Consequently, the chemical equilibrium: $NO+\frac{1}{2}O_2 \leftrightarrow NO_2$, is shifted far to the left, and the traces of any NOx present will mainly be in the form of NO. This is still true when the gas enters the condenser. Hence, practically no contaminating $NO_2$ is present in the gas and no $NO_2$ can be transferred to the liquid phase of condensed carbon dioxide, from which it is very difficult to remove.

In addition to the recirculation of the stripper off gas to the bottom of the flash column it is contemplated according to each of the embodiments described herein that any substantially pure carbon dioxide rich stream further down stream in a purification plant may alternatively be fed to the flash column instead of the stripper off gas. Accordingly, a fraction of the carbon dioxide rich stream leaving the washer of step h and/or a fraction of the carbon dioxide stream leaving the dehydrator of step j; and/or the carbon dioxide rich stream leaving the condenser of step k; and/or the carbon dioxide rich stream leaving the distiller of step l; and/or m. carbon dioxide from a storage tank may be fed to the flash column as appropriate in stead of the stripper off gas. In situations where the carbon dioxide stream is liquid, this liquid should be reboiled before entering the flash column. Reboiling is within the skill of the art.

Furthermore, because of the very low content of any contaminants, it has been found that the overall heat transfer coefficient is increased and the dew point temperature is raised for the gas as compared to conventional plants for carbon dioxide recovering. Therefore, the energy requirement for operating the condenser is reduced. Additionally, the suction pressure for refrigeration compressors for the condensation process is increased because of the low content of contaminants, making the mode of operation more efficient.

In the condenser, part of the gaseous carbon dioxide is liquefied. The amount of condensed carbon dioxide is determined by the temperature and the pressure according to thermodynamic rules. However, in the condenser it is necessary to continuously relieve some of the gas in order to prevent a build up of the contaminants. Consequently, some of the gaseous carbon dioxide will also be discharged. However, the less contaminants entering the condenser, the less is the requirement for relieving gases from the condenser. As a result, the product yield is increased, when comparing the plant according to the present invention with a conventional plant.

It is within the skills of an ordinary practitioner to determine the optimal conditions for operating the condenser.

The liquid leaving the condenser may subsequently enter a distillation column. This distillation step is optional and whether this step is necessary will depend on the purity of the carbon dioxide obtained in the condenser. During the distillation any traces of NO present in the liquid is distilled off. Hence, the produced liquid carbon dioxide is of very high purity.

Optionally, the liquid leaving the distillation column may enter a reboiler before the liquid carbon dioxide is entered into a storage tank. By introducing a reboiler in connection with the distillation column, a product carbon dioxide of higher purity is obtainable.

In an alternative embodiment, the gas from the dehydrator unit is fed directly to the bottom of the distillation column thus omitting the reboiler.

How to design and operate such a distillation column optionally together with a reboiler lies within the knowledge of a skilled person.

As mentioned above, a further advantage of one method according to the present invention is that the step of oxidising the stripper off gas is not necessary. Hence, the use of hazardous chemicals is avoided.

Yet another aspect of the present invention relates to the use of any of the methods according to the invention for the production of high purity carbon dioxide. The purity of the carbon dioxide product is preferably of food grade quality or suitable for enhanced oil recovery (EOR) or sequestration, and thus usable as a component in any kind of foodstuff or oil industry. In a particularly preferred embodiment, the carbon dioxide produced according to the method of the invention is used as a component in soft drinks.

In yet another aspect, a plant for recovery of high purity carbon dioxide is provided.

Such a plant comprises an absorption column having a gas outlet and a liquid outlet, said liquid outlet being connected to a flash column having a gas outlet and a liquid outlet, said liquid outlet being connected to a stripper column having a gas outlet and a liquid outlet, and where said gas outlet optionally is connected to a washing column. The optional washing column has a gas outlet and a liquid outlet, said optional gas outlet being connected to a dehydrator having a gas outlet, which is connected to a condenser having a gas outlet and a liquid outlet from which the produced liquid carbon dioxide is streaming to the storage tank.

In cases where the optional washing column is not present, the gas outlet of the stripper column is connected to the dehydrator.

In a preferred embodiment the liquid outlet of the condenser is connected to a distillation column having a liquid outlet from which the produced liquid carbon dioxide is streaming to the storage tank.

The absorption column to be used may be any column known in the art suitable for the performance of absorbing gaseous carbon dioxide into an absorbing agent. Examples of suitable absorption columns to be used are columns, which contain internals or mass transfer elements such as trays or random or structured packing.

The flash column may be any kind of flash distillation columns known in the art. Examples of suitable flash columns are columns, which contain internals or mass transfer elements, such as trays or random or structured packing. A skilled person may easily determine whether one or more high-pressure flash distillation column(s) or one or more low pressure distillation column(s) or a combination thereof is required in order to obtain a favourable result. It will also be within the knowledge of the skilled person to determine whether a desired result is best achieved by using only one column, or by using two or more columns connected in series or in parallel.

The stripper column to be used in the plant may be any packed column known in the art. Examples of suitable stripper columns are columns, which contain internals or mass transfer elements such as trays or random or structured packing.

The washing column may be any type of washing column known within the art. Preferably, the column to be used contains internals or mass transfer elements such as trays or random or structured packing in order to obtain a good distribution of the washing water and in order to obtain an optimal contact between the gas and the water.

The dehydrator is incorporated in order to remove water and other impurities from the gaseous stream. The process of dehydrating a gaseous stream is well known in the art, and a suitable dehydrator to perform the dehydration is easily selected by the skilled person. As examples dehydration units TSA adsorber with molecular sieves and filters of active carbon particles can be mentioned. Other types of dehydrators include MEG or TEG units.

The condenser to be used in the plant may be any type of heat exchanger suitable for the condensation. A skilled person would know how to design the condenser taking into account the temperature, pressure and chemical composition of the gas entering the condenser.

The distillation column may be any kind of column known in the art suitable for distilling liquid carbon dioxide. It will be within the knowledge of the skilled person to determine whether a desired result is best achieved by using only one column, or by using two or more columns connected in series or in parallel. The most suitable distillation column to be used is normally packed columns with a low pressure-drop, but also trayed columns may be employed.

In a preferred embodiment, the gas outlet of the flash column is connected to the absorption column. By this configuration, the gas leaving the flash column may be recycled to the absorption column. This recirculation has the beneficial effect of providing a second recovery step of the carbon dioxide, which was transferred from the liquid phase to the gas phase during the flashing step and, hence, otherwise would have been lost.

In another preferred embodiment, the liquid outlet of the stripper column is connected to the absorption column, which makes it possible to recycle the liquid leaving the stripper column. The beneficial effect of this recirculation is the reuse of absorbing agent, which otherwise would have to be disposed of.

In yet another preferred embodiment, the gas outlet from the stripper, which is connected to the washing column, is also connected to the flash column. In this embodiment, the gaseous water is removed from the stripper off gas when the stripper off gas is cooled by means of condensation, and the liquid water is then optionally recycled to the flash column. By this mode of operation, it is possible to adjust the water balance in the plant.

In still another preferred embodiment, the liquid outlet of the distillation column is connected to a reboiler in order to improve the purity of the product carbon dioxide.

It is within the standard procedure of a skilled person to calculate the numbers and sizes of each of the above-mentioned units of the plant when the mass flow, the chemical composition, the temperature, and the pressure of each stream is known in order to obtain the most feasible mode of operating the plant.

When selecting suitable materials for each of said units, special consideration must be directed to the temperature, the pressure, and the chemical and physical properties of the gases and liquids to be treated. Such considerations will be within the knowledge of a person skilled in the art. However, due to the low content of contaminants in the stripper off gas, the down stream equipment is less exposed to attacks from critical chemicals (such as $O_2$ in EOR applications) as compared to conventional plants.

Furthermore, a skilled person can easily acknowledge that the selection and control of process parameters will depend on the chemical composition of the gas entering the plant as well as the chemical composition and physical condition of the gases and liquids in each step of the method. Calculations for determining the number and size of heat exchangers in order to minimize the energy consumption for heating and cooling are standard procedures for a person skilled in the art. Also the selection of units for increasing and decreasing the pressure of the gas and liquid streams lies within the working area of a skilled person.

Figure 2:
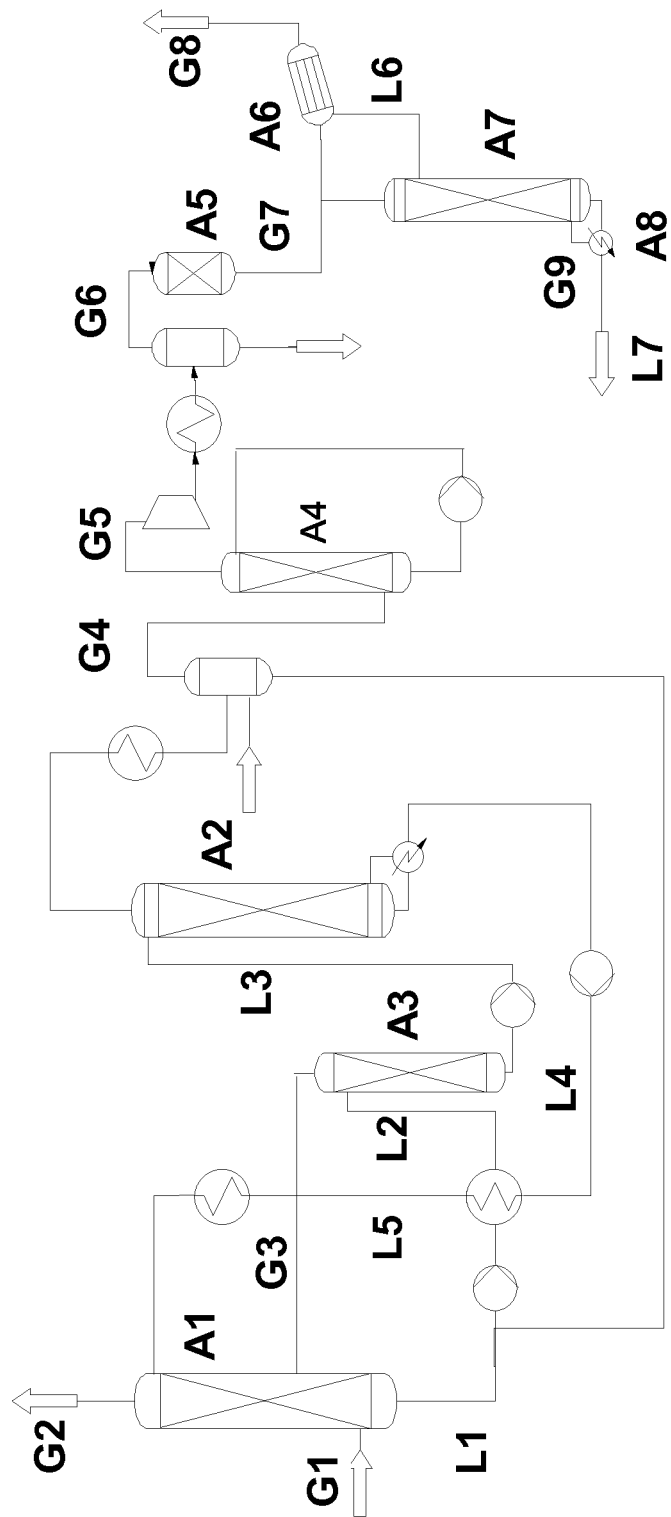
FIG. 2 depicts a schematic flow diagram for the $CO_2$ recovery in a conventional plant wherein a flash column according to the invention has been included.
Figure 3:
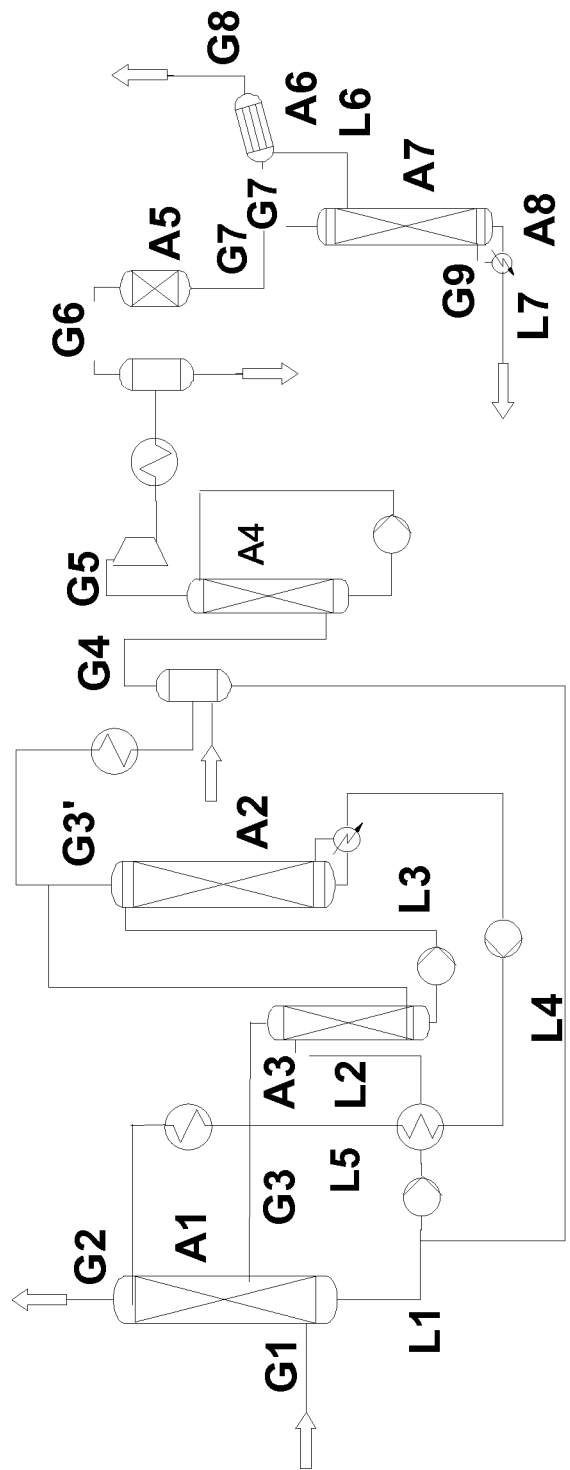
FIG. 3 depicts a schematic flow diagram for the $CO_2$ recovery in a conventional plant wherein a flash column according to the invention has been included and wherein the wet stripper off gas is recirculated to the flash column.

In the following, the invention is described in more detail with reference to the at present most preferred embodiments, which is shown in FIGS. 2 and 3 and with reference to a conventional plant, which is shown in FIG. 1. Said figures depict schematic flow diagrams for the $CO_2$ recovery.

Example According to the Invention

For the at present most preferred embodiment, data with respect to pressure and temperature as well as the chemical composition of the interesting gas and liquid streams are given in the table below. All references to pressures are to the total pressure. All percentages and ppm specifications are based on mole fractions. For the data relating to the gas streams, the data specified are based on wet gases. In this example reference is made to FIG. 2.

TABLE 1

Pressure, temperature and chemical composition of selected gas and liquid streams for the plant according to the present invention, in which a flash column is included.

| | Pressure (bar) | Temp. (° C.) | $CO_2$ Mole | $O_2$ mole | $NO_2$ mole | NO mole |
|---|---|---|---|---|---|---|
| Gas G1 entering the absorption column | 1.02 | 47 | 11% | 3.4% | 3 ppm | 100 ppm |
| Gas G2 leaving the absorption column | 1.02 | 43 | 600 ppm | 3.8% | <1 ppm | 115 ppm |
| Liquid L1 leaving the absorption column | 1.02 | 48 | 1.3% | <1 ppm | <1 ppm | <1 ppm |
| Liquid L2 entering the flash column | 3 | 95 | 1.2% | <1 ppm | <1 ppm | <1 ppm |
| Gas G3 leaving the flash column | 1.3 | 94 | 38% | 420 ppm | <1 ppm | 110 ppm |
| Liquid L3 entering the stripper | 3 | 94 | 1.2% | <1 ppm | <1 ppm | <1 ppm |
| Liquid L4 after the stripper | 2 | 112 | 0.6% | <1 ppm | <1 ppm | <1 ppm |
| Liquid L5 before the absorption column | 2 | 63 | 0.6% | <1 ppm | <1 ppm | <1 ppm |
| Gas G4 leaving the stripper after cooling | 1.2 | 45 | 92% | 1 ppm | <1 ppm | <1 ppm |
| Gas G5 leaving the washing column | 1.2 | 45 | 92% | 1 ppm | <1 ppm | <1 ppm |
| Gas G6 entering the dehydrator | 17 | 20 | 99.9% | 1 ppm | <1 ppm | <1 ppm |
| Gas G7 entering the condenser | 17 | 20 | ~100% | 1 ppm | <1 ppm | <1 ppm |

TABLE 1-continued

Pressure, temperature and chemical composition of selected gas and liquid streams for the plant according to the present invention, in which a flash column is included.

| | Pressure (bar) | Temp. (° C.) | $CO_2$ Mole | $O_2$ mole | $NO_2$ mole | NO mole |
|---|---|---|---|---|---|---|
| Gas G8 leaving the condenser | 17 | −24 | ~100% | 20 ppm | <1 ppm | <1 ppm |
| Liquid L6 leaving the condenser | 17 | −24 | ~100% | 1 ppm | <1 ppm | <1 ppm |
| Gas G9 recirculated from the reboiler to the distillation column | 17 | −24 | ~100% | 3 ppm | <1 ppm | <1 ppm |
| Liquid L7 leaving the reboiler | 17 | −24 | 100% | <1 ppm | <1 ppm | <1 ppm |

The gas G1 fed to the plant is a flue gas comprising 11% $CO_2$, 3.4% $O_2$, 3 ppm $NO_2$, and 100 ppm NO. This gas enters the absorption column A1 at a temperature of 47° C. and a pressure of 1.02 bar. The other main components in the feeding gas are 76.6% $N_2$, and 7.6% $H_2O$.

In the absorption column A1, the feeding gas G1 is mixed with the liquid L5, which is recycled from the stripper column A2. As the absorbing agent an aqueous solution of monoethanolamine is used. The gas stream G2 leaving the absorption column A1 has a temperature of 43° C. and a pressure of 1.02 bar, and comprises 600 ppm $CO_2$, 3.8% $O_2$, <1 ppm $NO_2$, and 115 ppm NO. Another major component is $N_2$, which is present in the gas G2 at 87%.

The liquid stream L1 leaving the absorption column A1 comprises the aqueous solution of monoethanolamine, in which the contents of $O_2$, $NO_2$ and NO are <1 ppm. When leaving the absorption column A1, the liquid stream L1 has a temperature of 48° C. and a pressure of 1.02 bar. However, before entering the flash column A3 as the liquid L2 the temperature is increased to 95° C. and the pressure is increased to 3 bar.

In the flash column A3 the liquid L2 is separated into a gas stream G3 and a liquid stream, which are both leaving the flash column A3 at a temperature of 94° C. and a pressure of 1.3 bar. The gas G3 leaving the flash column A3 comprises 38% $CO_2$, 420 ppm $O_2$, and 110 ppm NO. The content of $NO_2$ in G3 is <1 ppm. Other components, such as $H_2O$, oxygenates as for example acetaldehyde, volatile organics, and argon, are also present in the gas G3. In the specific embodiment shown in FIG. 1, the gas stream G3 is recycled to the absorption column A1. The main component of the liquid leaving the flash column A3 is the aqueous solution of monoethanolamine.

The pressure of the liquid stream leaving the flash column A3 is then increased to 3 bar just before entering the stripper column A2.

In the stripper A2, the liquid L3 is separated into a gas stream and a liquid stream. The liquid stream L4 has a temperature of 112° C. and a pressure of 2 bar, and the content of $CO_2$ is 0.6 ppm, whereas the contents of $O_2$, $NO_2$, and NO are <1 ppm. In the embodiment shown in FIG. 1, the liquid stream L4 is recycled to the absorption column A1 as the liquid stream L5. However, before entering the absorption column A1, the temperature of the liquid stream L5 is decreased to 63° C.

The gas stream, which leaves the stripper, is then cooled to a temperature of 45° C. In the shown embodiment, part of the gas (mostly gaseous water) is condensed during the cooling step, and said condensed liquid is recycled and mixed with the liquid stream, which is to enter the flash column A3. The part of the condensed gas, which is not condensed (that is the gas G4), is subsequently entering the washing column A4 at a temperature of 45° C. and a pressure of 1.2 bar. Furthermore, the content of the interesting chemical components in this stream constitutes 92% $CO_2$ and 1 ppm $O_2$, whereas the contents of $NO_2$ and NO are <1 ppm.

The gas G5 leaves the washing column A4 at the same temperature and pressure as when entering said column. Furthermore, the content of $CO_2$ and $O_2$ also remains unchanged. Afterwards the pressure of this gas is increased to 17 bar and the temperature is decreased to 20° C. before the gas G6 enters the dehydrator A5. When entering the dehydrator A5, the gas G6 contains 99.9% $CO_2$ and 1 ppm $O_2$. In the dehydrator A5, the traces of water, oxygenates and volatile organics are removed. Therefore, when the gas G7 leaves the dehydrator A5, the content of $CO_2$ has increased to ~100%. The temperature and the pressure of the gas do not change during the dehydration.

Hence, the gas G7 enters the condenser A6 at a temperature of 20° C., a pressure of 17 bar, and a content of $CO_2$ and $O_2$ of ~100% and 1 ppm, respectively. The gas G8, which is discharged from the condenser comprises ~100% of $CO_2$ and 20 ppm $O_2$. The contents of $NO_2$ and NO in this gas stream are <1 ppm.

The liquid L6 leaving the condenser A6 is then led into a distillation column A7 at a temperature of −24° C. and a pressure of 17 bar. In the specific embodiment shown in FIG. 2, the distillation column A7 is connected with a reboiler A8 in order to improve the purity of the liquid product CO2 L7. In this configuration a gas G9 comprising ~100% CO2 and 3 ppm O2 is recycled from the reboiler A8 to the distillation column A7. The product stream L7 leaves the plant at a temperature of −24° C. and a pressure of 17 bar. The content of CO2 is expressed as 100% as this stream only contains traces of O2 (<1 ppm) and N2 (<1 ppm).

Comparative Example

In comparison a plant without a flash step is described below. This plant is identical to the plant according to the present invention with the exception that no flash column is placed between the absorption column and the stripper column. Data with respect to pressure and temperature as well as the chemical composition of the interesting gas and liquid streams for a conventional plant are given in the table below. All references to pressures are to the total pressure. All percentages and ppm specifications are based on mole fractions. For the data relating to the gas streams, the data specified are based on wet gases. In this example, reference is made to FIG. 1.

TABLE 2

Pressure, temperature and chemical composition of selected gas and liquid streams for the conventional plant, in which no flash column is included.

| | Pressure (bar) | Temp. (° C.) | $CO_2$ mole | $O_2$ mole | $NO_2$ mole | NO mole |
|---|---|---|---|---|---|---|
| Gas G1 entering the absorption column | 1.02 | 47 | 11% | 3.4% | 3 ppm | 100 ppm |
| Gas G2 leaving the absorption column | 1.02 | 44 | 640 ppm | 3.8% | <1 ppm | 112 ppm |
| Liquid L1 leaving the absorption column | 1.02 | 48 | 1.4% | <1 ppm | <1 ppm | <1 ppm |
| Liquid L2 entering the stripper column | 3 | 95 | 1.3% | <1 ppm | <1 ppm | <1 ppm |
| Liquid L4 after the stripper | 2 | 112 | 0.6% | <1 ppm | <1 ppm | <1 ppm |
| Liquid L5 before the absorption column | 2 | 63 | 0.6% | <1 ppm | <1 ppm | <1 ppm |
| Gas G4 leaving the stripper after cooling | 1.2 | 45 | 92% | 65 ppm | <1 ppm | 20 ppm |
| Gas G5 leaving the washing column | 1.2 | 45 | 92% | 65 ppm | <1 ppm | 20 ppm |
| Gas G6 entering the dehydrator | 17 | 20 | 99.8% | 70 ppm | <1 ppm | 20 ppm |
| Gas G7 entering the condenser | 17 | 20 | 99.9% | 70 ppm | <1 ppm | 20 ppm |
| Gas G8 leaving the condenser | 17 | −25 | 98.0% | 1250 ppm | <1 ppm | 20 ppm |
| Liquid L6 leaving the condenser | 17 | −25 | 99.9% | 90 ppm | 20 ppm | 1 ppm |
| Gas G9 recirculated from the reboiler to the distillation column | 17 | −24 | 99.9% | 180 ppm | <1 ppm | 2 ppm |
| Liquid L7 leaving the reboiler | 17 | −24 | ~100% | 12 ppm | 20 ppm | <1 ppm |

In this plant the gas G1 fed to the plant is a flue gas comprising 11% $CO_2$, 3.4% $O_2$, 3 ppm $NO_2$, and 100 ppm NO. This gas enters the absorption column A1 at a temperature of 47° C. and a pressure of 1.02 bar. The other main components in the feeding gas are 76.6% $N_2$, and 7.6% $H_2O$. Hence, the feeding gas is identical to the feeding gas used to describe the plant according to the present invention.

In the absorption column A1, the feeding gas G1 is mixed with the liquid L5, which is recycled from the stripper column A2. As the absorbing agent an aqueous solution of monoethanolamine is used. The gas stream G2 leaving the absorption column A1 has a temperature of 44° C. and a pressure of 1.02 bar, and comprises 640 ppm $CO_2$, 3.8% $O_2$, <1 ppm $NO_2$, and 112 ppm NO.

The liquid stream L1 leaving the absorption column A1 comprises the aqueous solution of monoethanolamine. The contents of $O_2$, $NO_2$ and NO are <1 ppm. When leaving the absorption column A1, the liquid stream L1 has a temperature of 48° C. and a pressure of 1.02 bar. This liquid is led to the stripper column A2. However, before entering the stripper column A2 as the liquid L2 the temperature is increased to 95° C. and the pressure is increased to 3 bar.

In the stripper A2 the liquid L2 is separated into a gas stream and a liquid stream. The liquid stream L4 has a temperature of 112° C. and a pressure of 2 bar, and the content of $CO_2$ is 0.6 ppm, whereas the contents of $O_2$, $NO_2$, and NO are <1 ppm. In the embodiment shown in FIG. 2, the liquid stream L4 is recycled to the absorption column A1 as the liquid stream L5. However, before entering the absorption column A1 the temperature of the liquid stream L5 is decreased to 63° C.

The gas stream, which leaves the stripper, is then cooled to a temperature of 45° C. In the shown embodiment part of the gas (mostly gaseous water) is condensed during the cooling step, and said condensed liquid is recycled and mixed with the liquid stream, which is to enter the stripper column A2. The part of the condensed gas, which is not condensed (that is the gas G4), is subsequently entering the washing column A4 at a temperature of 45° C. and a pressure of 1.2 bar. Furthermore, the content of the interesting chemical components in this stream constitutes 92% $CO_2$, 65 ppm $O_2$, and 20 ppm NO. The content of $NO_2$ is <1 ppm.

The gas G5 leaves the washing column A4 at the same temperature and pressure as when entering said column. Furthermore, the contents of $CO_2$, $O_2$, and NO also remain unchanged. Afterwards the pressure of this gas is increased to 17 bar, and the temperature is decreased to 20° C. before the gas G6 enters the dehydrator A5. When entering the dehydrator A5 the gas G6 contains 99.8% $CO_2$, 70 ppm $O_2$, and 20 ppm NO. In the dehydrator A5, the traces of water, oxygenates and volatile organics are removed. When the gas G7 leaves the dehydrator A5, the content of $CO_2$ has increased to 99.9%, whereas the content of $O_2$ and NO is unchanged. The temperature and the pressure of the gas do not change during the dehydration.

Hence, the gas G7 enters the condenser A6 at a temperature of 20° C., a pressure of 17 bar, and a content of $CO_2$, $O_2$, and NO of 99.9%, 70 ppm and 20 ppm, respectively. The gas G8, which is discharged from the condenser comprises 98.0% of $CO_2$, 1250 ppm $O_2$, <1 ppm $NO_2$, and 20 ppm NO.

The liquid L6 leaving the condenser A6 is then led into a distillation column A7 at a temperature of −25° C. and a pressure of 17 bar. In the specific embodiment shown in FIG. 1, the distillation column A7 is connected with a reboiler A8 in order to improve the purity of the liquid product CO2 L7. In this configuration, a gas G9 comprising 99.9% CO2, 180 ppm O2, <1 ppm NO2, and 2 ppm NO is recycled from the reboiler A8 to the distillation column A7. The product stream L7 leaves the plant at a temperature of −24° C. and a pressure of 17 bar. The content of $CO_2$ is expressed as ~100% as this stream also contains contaminants such as 12 ppm of $O_2$, 20 ppm $NO_2$, and <1 ppm NO.

When these data are compared with the data relating to the method according to the present invention, it is clear that the contents of contaminants are markedly higher for the plant, in which no flash column is incorporated. For comparison, it is well known that food grade $CO_2$ specifications typically state a maximum of 2.5 ppm NO and 2.5 ppm $NO_2$.

In the above examples, the beneficial effect of introducing a flash column has been demonstrated as compared to the same overall process without the flash column.

In the following, the effect of the flash column on benzene removal at varying benzene levels in the feeding gas, with and without recirculation of the wet gas leaving the stripper column to the bottom of the flash column, is illustrated as well as the effect on removal of $N_2$ and $O_2$ (and consequently NOx's) when a fraction of the stripper off gas is recirculated.

Though recirculation of the stripper off gas is illustrated the effect of recirculating any other carbon dioxide rich stream as contemplated herein should result in substantially the same effect.

Benzene Removal

In the table, reference to the gaseous streams are G1, G3' and G3 which correspond to the gas fed to the absorption column A1, the stripper off gas leaving the stripper column A2, and the gas leaving the flash column A3, respectively. For an illustrative explanation of the streams, see FIG. 3.

This example was performed essentially in accordance with the "example of the invention" above where more details on the process cam be found.

This example shows the benzene recovery in the carbon dioxide rich gaseous stream G3' leaving the stripper at various benzene concentrations (100, 10, 1, 0.5 ppm) in the gas G1 fed to the absorber.

In the table is shown benzene recovery in the stripper off gas in a prior art carbon dioxide recovery plant (No flash), in a plant with a flash column according to the invention, without (Atm. Flash) and with recirculation of the stripper off gas at the bottom of the flash column. The stripper off gas was fed 2% and 4% (mole/mole) of the stripper off gas (atm., flash and X % split), respectively.

TABLE 3

| Benzene fed in G1 (ppm) | No Flash | Atm. Flash | Atm. Flash and 2% split | Atm. Flash and 4% split |
|---|---|---|---|---|
| | Benzene content in G3' (ppb) | | | |
| 100 | 11073.96 | 3214.37 | 481.33 | 52.27 |
| 10 | 1107.54 | 342.67 | 67.19 | 5.27 |
| 1 | 110.74 | 55.44 | 25.79 | 0.57 |
| 0.5 | 55.37 | 39.49 | 23.49 | 0.30 |
| | % benzene recovery (nG3'/nG1) | | | |
| 100 | 11.07 | 3.21 | 0.48 | 0.05 |
| 10 | 11.08 | 3.43 | 0.67 | 0.06 |
| 1 | 11.07 | 5.54 | 2.58 | 0.06 |
| 0.5 | 11.07 | 7.90 | 4.70 | 0.06 |
| | kg $CO_2$ in recycle in G3 | | | |
| 100 | 0 | 52.56 | 51.30 | 111.04 |
| 10 | 0 | 52.56 | 52.10 | 111.05 |
| 1 | 0 | 52.56 | 51.30 | 111.05 |
| 0.5 | 0 | 52.56 | 51.30 | 111.05 |

In table 4, the effect of introducing the flash column on $N_2$ and $O_2$ (and consequently NOx)) is shown without recirculation of the stripper off gas to the flash column and with recirculation at 2% and 4%, respectively and benzene recovery is summarized.

TABLE 4 summary of gas component concentrations
Effect of recirculation of stripper off gas on removal of other components

| Summary of component concentrations in G3' | Concentration of components in G3' | | | |
|---|---|---|---|---|
| | Without flash | Normal flash | Flash with 2% spilt | Flash with 4% split |
| | G1 | G3' | G3' | G3' | G3' |
| $CO_2$ | 9.80% | 99.89.% | 100.00% | 100.00% | 100.00% |
| $N_2$ | 88.24% | 1053.16 ppmV | 10.65 ppmV | 1.15 ppbV | 0.10 ppbV |
| $O_2$ | 1.96% | 44.02 ppmV | 0.74 ppmV | 0.22 ppbV | 0.02 ppbV |

| Summary of benzene concentrations in G3' | Concentration of benzene in G3' | | | |
|---|---|---|---|---|
| | Without flash | Normal flash | Flash with 2% split | Flash with 4% split |
| Benzene | 100.00 ppmV | 11.07 ppmV | 3.21 ppmV | 481.33 ppbV | 52.27 ppbV |
| Benzene | 10.00 ppmV | 1.11 ppmV | 342.67 ppbV | 67.19 ppbV | 5.27 ppbV |
| Benzene | 1.00 ppmV | 110.74 ppbV | 55.44 ppbV | 25.79 ppbV | 0.57 ppbV |
| Benzene | 0.50 ppmV | 55.37 ppbV | 39.49 ppbV | 23.49 ppbV | 0.30 ppbV |

In table 4, the concentration of benzene, oxygen and nitrogen is summarised when carbon dioxide is purified according to the present invention. It is evidently clear form the table that introducing the flash step has an effect on removal of undesired components in the gas.

Introducing relatively small amounts of the stripper off gas (warm wet carbon dioxide gas) to the flash column has a dramatic effect on further removal of undesired components so that only trace amounts in the ppb ranges were present in the stripper off gas.

In FIG. 4 it is illustrated how it was surprisingly and unexpectedly found that the flash column achieved the most effective benzene removal when the concentration in the feeding gas G1 was 10 ppm and higher.

Fed with 4% stripper off gas or higher also effective removal was observed with lower amounts of benzene in the feeding gas (i.e. 10 ppm or lower).

The invention claimed is:

1. A method for the removal of contaminants, including at least benzene, from a carbon dioxide feeding liquid stream, originating from a carbon dioxide feeding gas stream, comprising the steps of:
   c. pressurizing and heating the carbon dioxide feeding liquid stream; and
   d. introducing the carbon dioxide feeding liquid stream into a flash column to provide a resulting benzene and NOx lean liquid stream and a carbon dioxide containing gaseous stream;
   e. pressurizing the resulting liquid stream leaving the flash column in step d;
   f. separating the liquid stream obtained in step d or e into a carbon dioxide-rich stripper off gas and a carbon dioxide-depleted liquid by means of stripping in a stripper column; and
   g. feeding a gaseous fraction of the carbon dioxide rich stripper off gas to the bottom of the flash column of step d.

2. The method according to claim 1, wherein the carbon dioxide feeding gas stream is flue gas.

3. The method according to claim 1, wherein the contaminants in addition to benzene are selected from the group consisting of nitrogen containing compounds, sulphurous compounds, and volatile organic compound.

4. The method according to claim 1, wherein the concentration of benzene in the carbon dioxide feeding gas stream varies.

5. The method according to claim 1, wherein the fraction of the gaseous fraction of the stripper off gas fed to the flash column is at least 1% (mole/mole) of the total stripper off gas.

6. The method according to claim 1, wherein the fraction of the gaseous fraction of the stripper gas fed to the flash column is at least 1-8% (mole/mole) of the total stripper off gas.

7. The method according to claim 1, wherein the carbon dioxide rich gaseous stream leaving the flash column is recovered by recirculating the stream to the absorption column of step a.

8. The method according to claim 1, wherein the amount of benzene recovered is between 0% and 4.7%.

9. The method according to claim 1, wherein the concentration of benzene in the carbon dioxide feeding gas stream is 1 ppm (mole/mole) or higher.

10. The method according to claim 9, wherein the concentration of benzene in the carbon dioxide feeding gas stream is 10 ppm (mole/mole) or higher.

11. The method according to claim 1, wherein the step c is preceded by the steps of:
   a. feeding a gas comprising carbon dioxide, oxygen, nitrogen oxides, volatile organic contaminants, including benzene, into an absorption column, and
   b. absorbing the gas in an absorbing agent, by which the gas is separated into a carbon dioxide-lean gas and the carbon dioxide feeding liquid stream.

12. The method according to claim 11, wherein the absorbing agent is an amine-based absorbing agent.

13. The method according to claim 11, wherein the absorbing agent is an amine-based absorbing agent.

14. A method for the removal of contaminants, including at least benzene, from a carbon dioxide feeding liquid stream, originating from a carbon dioxide feeding gas stream, comprising the steps of:
   a. feeding a gas comprising carbon dioxide, oxygen, nitrogen oxides, volatile organic contaminants, including benzene, into an absorption column,
   b. absorbing the gas in an absorbing agent, by which the gas is separated into a carbon dioxide-lean gas and the carbon dioxide feeding liquid stream,
   c. pressurising and heating the carbon dioxide feeding liquid stream,
   d. introducing the carbon dioxide feeding liquid stream into a flash column to provide a resulting benzene and NOx lean liquid stream and a carbon dioxide containing gaseous stream;
   e. pressurizing the resulting liquid stream leaving the flash column in step d;
   f. separating the liquid stream obtained in step d or e into a carbon dioxide-rich stripper off gas and a carbon dioxide-depleted liquid by means of stripping in a stripper column; and
   wherein the method is followed by at least one of the steps of:
   g. washing the carbon dioxide stripper off gas obtained in step f by means of a washing column in order to produce a gas substantially free of soluble contaminants; and
   h. dehydrating the carbon dioxide-rich stripper off gas obtained in step f or the gas substantially free of soluble contaminants obtained in step g by means of a dehydrator and thereby providing a dry gas substantially free of water, oxygenates, traces of methanol, and volatile organics;
   wherein the method further comprises the steps of:
   i. separating the carbon dioxide-rich stripper off gas obtained in step f, the gas substantially free of soluble contaminants obtained in step g or the dry gas obtained in step h into a mixture of a second carbon dioxide rich liquid and non-condensable gases by means of a condenser; and
   j. distilling the carbon dioxide rich liquid obtained in step i in a distillation column in order to produce liquid high purity carbon dioxide which is substantially free of nitrogen oxides, sulphurous compounds and volatile organic compounds, and
   k. storing the liquid high purity carbon dioxide in a storage tank,
   wherein a fraction of at least one of the carbon dioxide rich streams of any of the steps g, h, i, j, or k is recirculated and fed at the bottom of the flash column of step d.

15. The method according to claim 14, wherein the fraction of the carbon dioxide rich stream fed to the flash column is at least 1% (mole/mole) of the total gas of the at least one stream being recirculated.

16. The method according to claim 14, wherein the fraction of the carbon dioxide rich stream fed to the flash column is 1 to 8% (mole/mole) of the total gas of the at least one stream being recirculated.

17. The method according to claim 14, wherein the absorbing agent is an amine-based absorbing agent.

18. The method according to claim 14, wherein the carbon dioxide feeding gas stream is flue gas.

19. The method according to claim 14, wherein the amount of benzene recovered is between 0% and 4.7%.

20. The method according to claim 14, wherein the liquid high purity carbon dioxide obtained is provided in a process selected from preparation or processing of a foodstuff, preparation or processing of hospital devices or enhanced oil recovery or sequestration.

21. The method according to claim 20, wherein the foodstuff is a beverage.

* * * * *